April 20, 1948. J. K. HODNETTE 2,439,931
PROTECTIVE FUSE FOR ELECTRICAL APPARATUS
IMMERSED IN A DIELECTRIC LIQUID
Filed Jan. 29, 1944 2 Sheets-Sheet 1

INVENTOR
John K. Hodnette.
BY
ATTORNEY

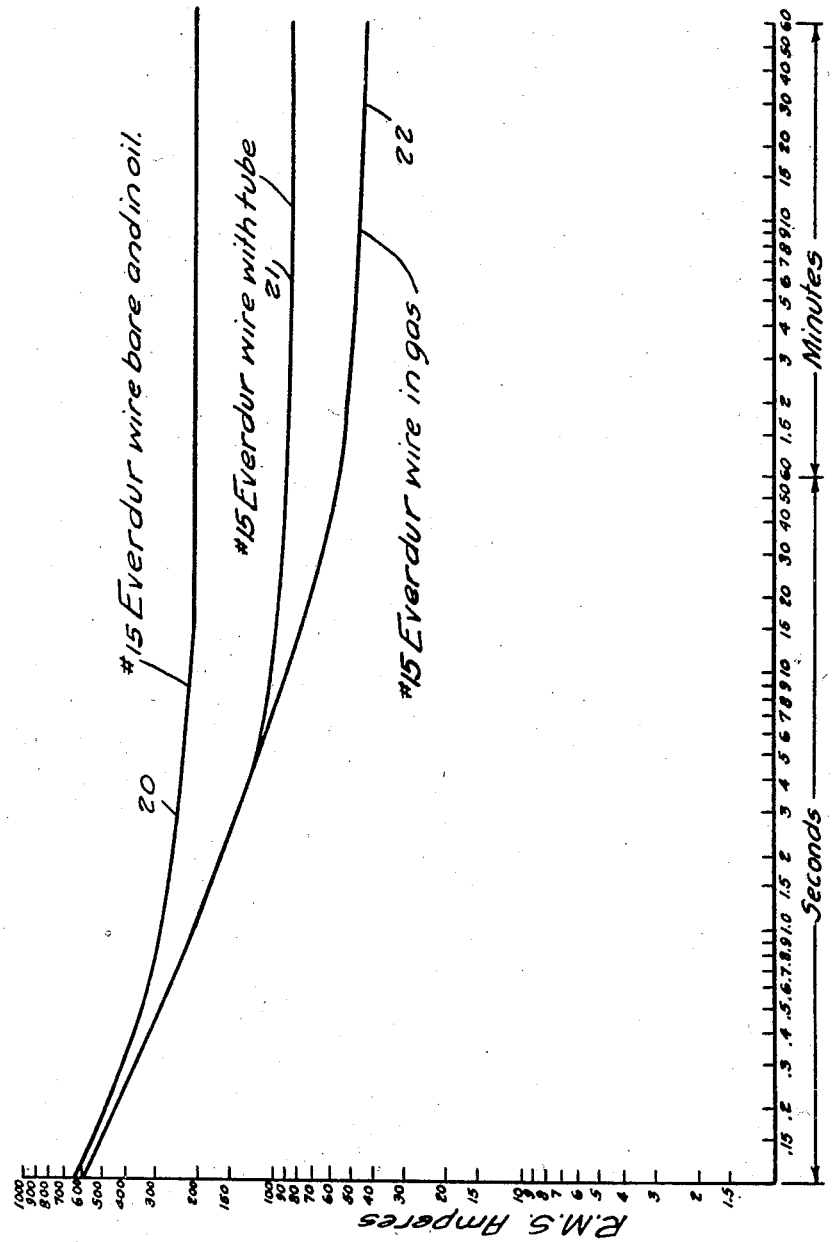

Patented Apr. 20, 1948

2,439,931

UNITED STATES PATENT OFFICE 2,439,931

PROTECTIVE FUSE FOR ELECTRICAL APPARATUS IMMERSED IN A DIELECTRIC LIQUID

John K. Hodnette, Sharon, Pa., assignor to Westinghouse Electric Corporation, East Pittsburgh, Pa., a corporation of Pennsylvania Application January 29, 1944, Serial No. 520,222

3 Claims. (Cl. 175—294)

This invention relates generally to protective devices for electrical apparatus, and more particularly to protective links for transformers and similar electrical devices.

The object of the invention is to provide a protective link for electrical apparatus which responds to abnormal conditions in the apparatus to change its fusing characteristics to effect the interruption of the circuit through the electrical apparatus.

The invention accordingly is disclosed in the embodiment thereof shown in the accompanying drawings and comprises the features of construction, combination of elements and arrangement of parts which will be exemplified in the construction hereinafter set forth and the scope of the application of which will be indicated in the appended claims.

For a fuller understanding of the nature and objects of the invention, reference should be had to the following detailed description taken in connection with the accompanying drawings in which.

The utility and functioning of this invention can more readily be explained by first giving a short resumé of the need for this device and the function it is intended that it shall perform. It will be readily appreciated as the description proceeds that the protective link may be utilized in conjunction with different electrical devices, but its use with transformers will be described in particular.

In many distribution systems transformers are directly connected to feeders and are not provided with protective devices other than switches or fuses located at a distance, as, for example, at power stations, for disconnecting them from the line in case of failure or faults within the transformer itself. The well known network transformer is a good example of this type of transformer and is generally connected directly to the line without any means for interrupting its circuit in case of internal failure.

It is the purpose of this invention to provide a protective link for disconnecting transformers such as a network transformer from the line in case of internal failure without interrupting the service. Provision of means for interrupting the transformer circuit upon failures in the transformer itself will avoid primary and secondary explosions which so often occur in service systems.

When a number of network transformers are supplied from a common feeder through a circuit breaker at a substation, the secondaries of these transformers, as well as the secondaries of other transformers fed from other feeders, may be connected in parallel to form a secondary network system. In case of an external fault in the secondary distribution system sufficient power is fed into it to burn it clear. However, in the case of an internal fault, such as a stewing arc, in one of the transformers, there is generally no protective device in the circuit which will respond to such abnormal operating conditions, and it may continue until an explosion takes place.

When a stewing arc occurs in a transformer coil it generates gas from the insulation and also from the dielectric liquid. Both oil and the now well known fireproof dielectrics are subject to decomposition and the generation of gas by a stewing arc. These gases may be generated in sufficient volume to blow up the transformer, and if the dielectric employed is an oil the gases generated are combustible and are likely to be ignited causing a secondary explosion which is usually very destructive. If a fireproof dielectric such as Askerel is employed, there will be no secondary explosion but the gases released by the primary explosion are poisonous and if released in volume in populated sections they are hazardous.

Figure 1:
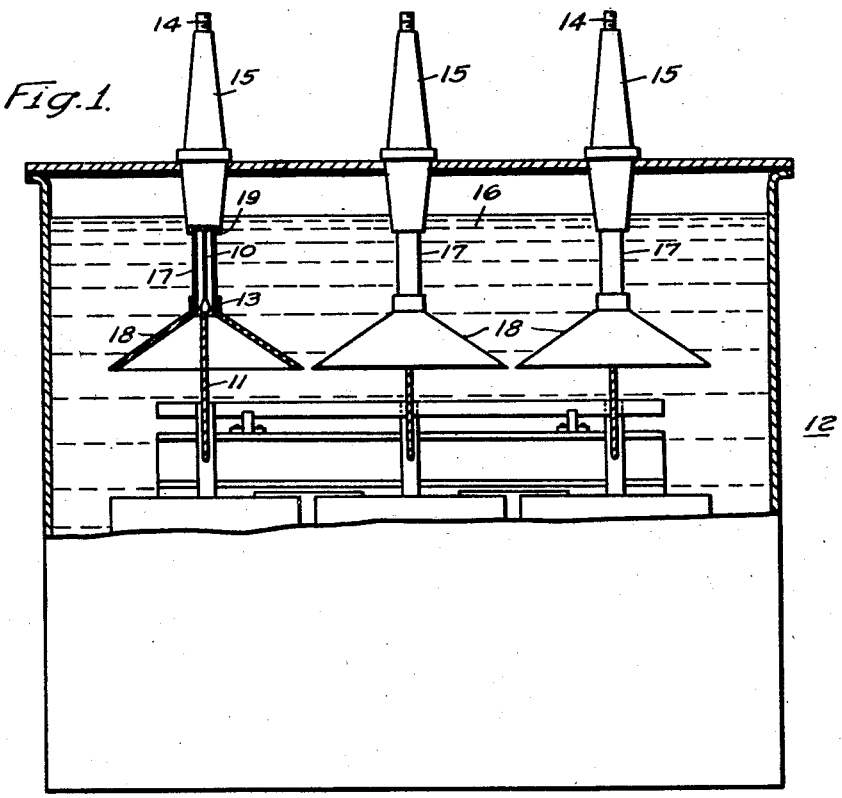
Figure 1 is a view, partly in section and partly in side elevation, of a protective link applied to a transformer and constructed in accordance with the teachings of the present invention.

Referring now to Fig. 1, the present invention comprises a fusible conductor 10 which will be selected to meet predetermined operating conditions. It has been found from experience in building protective links of this kind that a wire sold to the trade under the name "Everdur" has satisfactory characteristics for adapting it for use in protective links for transformers. Further copper wire may be utilized for the fusible conductor. The method of selecting a suitable fusible conductor has been explained in my Patent No. 2,223,726, issued December 3, 1940, and it is believed that it is not necessary to give any further details on the selection of a suitable fusible conductor for meeting predetermined operating conditions.

As illustrated, the fusible conductor 10 is connected in series circuit relation with the lead wire 11 from one phase of the three-phase transformer shown generally at 12. In this particular embodiment of the invention the fusible conductor 10 is provided with the projectile 13 on its lower end between the lead 11 and the body of the fusible conductor 10. The purpose of the projectile is to cooperate in the separation of the fused portions of the fusible conductor when it is disrupted by a predetermined overcurrent. The upper end of the fusible conductor 10 is connected to the conductor 14 extending through bushing 15.

As shown, the transformer 12 is filled with some suitable dielectric 16. The dielectric most commonly used is oil which is readily decomposed when exposed to an electric arc and gases are generated in quantity. The fireproof dielectrics referred to hereinbefore are also readily decomposed when exposed to arcing conditions.

The fusible conductor 10 is provided with a tubular casing 17 which, in this embodiment of the invention, is made of some suitable material such as fibre and about the same length as the fusible conductor and is suspended from the bushing 15. It may be mounted in any suitable manner and it is not deemed necessary to explain since anyone skilled in the art can readily mount the case 17. The size of the case 17 relative to the fusible conductor 10 will depend upon the design conditions to be met.

Figure 2:
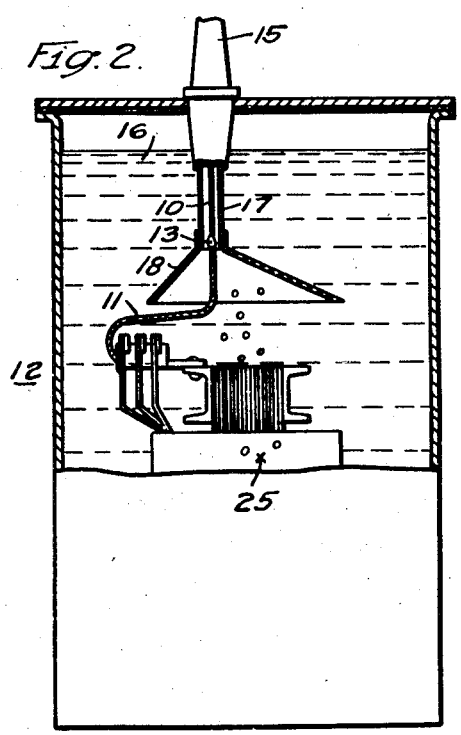
Fig. 2 is a view, partly in section and partly in end elevation, showing details of the construction.

A hood 18 simulating an inverted funnel depends from the lower end of the case 17 into the dielectric 16. The design of the transformer will determine the shape of this hood or funnel 18. Shown in Fig. 2, the hood 18 projects much further to one side than the other. This is because of the fact that the bushings of the transformer are usually located nearer one edge than the other. The main purpose of the funnel is to cover as large an area as possible in the transformer in order to collect in the shortest time the largest amount of evolved gases. The funnel or funnels should cover an area larger than the horizontal cross sectional area of the core and coils of the electrical apparatus to be protected for the most rapid operation.

It sometimes happens in the operation of transformers that small amounts of gases may be generated without a dangerous condition being existent in the transformer. Any gas that rises in the dielectric will be collected by the hood or hoods 18. In order to prevent the accumulation of gases evolved under operating conditions which are not objectionable, a small perforation 19 is provided near the upper end of the case 17 to permit the gases thus generated to escape and collect in the top of the transformer case. These gases, if not generated in quantity, may be absorbed by the dielectric liquids, or, if they are not absorbed, they do not collect in sufficient quantity to cause a primary explosion and the bursting of the transformer case or tank. The provision of a small opening such as 19 is usually adequate for ordinary purposes. However, it is to be understood that many refinements may be added to the perforation 19. For example, a ball release valve may be mounted in the perforation to control the escape of gases. The control of the escape of gases is something that can be worked out in accordance with well known methods.

The curves shown in Fig. 4 show the time current characteristics of one size of Everdur wire that may be utilized as the fusible conductor in the protective link. The curve 20 shows the characteristics of No. 15 Everdur wire bare and immersed in oil. The capacity of the oil for dissipating heat generated in the fusible conductor is great and the temperature of the wire does not rise rapidly. The curve 21 is plotted from test results obtained with a No. 15 Everdur wire enclosed in a tube such as described in my patent identified hereinbefore. In this instance the cracked dielectric partially or completely displaces the liquid enveloping the wire. Curve 22 shows the characteristics of No. 15 Everdur wire when enveloped in a gas such as would be evolved in the electrical apparatus when a stewing arc occurs.

The composition of the gas generated upon the occurrence of a stewing arc in a transformer coil is probably very complex. Gases are produced by the decomposition of the dielectric, and by the destruction of the resins and other materials utilized for impregnating the fabric wrapped around the conductor in the process of insulating it.

Figure 3:
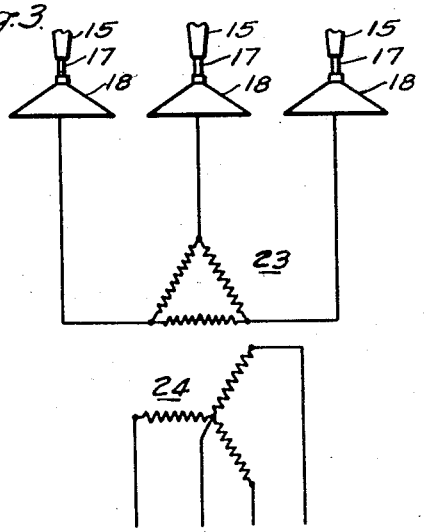
Fig. 3 is a diagrammatic view showing protective links constructed in accordance with this invention connected in the leads of a three-phase delta-connected transformer; and, Fig. 4 is a set of curves showing the current time characteristics of a fusible conductor such as utilized in the protective link when subjected to different operating conditions.

In Fig. 3 a schematic diagram of a transformer is shown. The primary winding 23 of the transformer illustrated in the diagram is delta-connected while the secondary 24 is Y-connected. However, it is to be understood that this has nothing to do with the invention, which may be utilized with multi-phase transformers, single-phase transformers, and in either the primary or secondary circuit connections.

In the operation of the transformer 12, if a stewing arc occurs at the point 25 in the transformer, then the gas generated either from the resins in the insulation or by the decomposition of the dielectric will rise as indicated and be collected by the hood 18. This gas will be directed into the case 17 and will displace the dielectric. When the stewing arc is of serious proportions the gas will be generated at a rapid rate and will not escape through the opening 19 fast enough to interfere with the functioning of the protective link in accordance with the teaching of this invention. When the gas has displaced the dielectric in the case 17, the characteristics of the fusible conductor 10 will have changed from the characteristics given by curve 20 to the characteristics illustrated by curve 22. Therefore, it will be seen that a much smaller current will fuse the fusible conductor and disconnect the transformer from the line.

In order to convey a better idea of the functioning of this device, an example will be given. The test results obtained using a 300 kva. 13,800-volt network transformer having an impedance of about 5% will be given. The curve 20 reveals that a No. 15 Everdur link, bare and in oil, will fuse with a minimum current of about 200 amperes. It has been found in practice that for a transformer of this size a fusible conductor made from No. 15 Everdur wire will permit a burning off of secondary faults. When the dielectric has been displaced from the case 17 and the fusible conductor is enveloped in a gas, then a No. 15 Everdur link will fuse at a minimum current of about 40 amperes or 325% normal load which values of current are obtained during fault conditions in the winding of the transformer. Thus, by providing means for collecting the gases the characteristics of the protective link can be changed greatly.

It is well known that the current resulting from a turn-to-turn fault in a transformer builds up spasmodically and as the stewing arc develops more and more turns and layers of the coil are involved. Therefore, after the first appearance of the stewing arc there is usually several minutes for the gas to accumulate and change the characteristics of the protective link before a primary explosion will occur. This gives sufficient time for the protective link to interrupt the circuit to the electrical apparatus to be protected and prevent any serious damage to the transformer. It also protects the public who may be congregated in stores or on streets where these network transformers are installed in order to give the necessary service.

As has been pointed out hereinbefore, this type of protective link can be used successfully with well known non-combustible dielectrics and also with oil. In case the protective link is to be utilized with transformers other than network transformers and with other electrical apparatus, it may be desirable to use a link with a lower rating than that illustrated hereinbefore so as to properly coordinate the link with the breakers provided in the electrical system. To meet such requirements, a suitable fusible conductor can be readily selected in accordance with the teachings of my patent identified hereinbefore.

Since certain changes may be made in the above protective device and different embodiments of the invention could be made without departing from the scope thereof, it is intended that all matter contained in the above description or shown in the accompanying drawing shall be interpreted as illustrative and not in a limiting sense.

I claim as my invention:

1. In a protective device for electrical apparatus provided for a conductor wound into a coil and a liquid dielectric in which the coil is immersed, in combination, a fusible conductor having predetermined fusing characteristics connected in circuit relation with the coil to be protected and immersed in the liquid dielectric, a tubular member disposed around the fusible conductor, the tubular member having an opening therein near the upper end to provide for the escape of gas at a predetermined rate and a hood depending from the bottom of the tubular member, the hood being disposed above the coil to collect gases evolved as a result of arcing conditions in the coil and to deliver them to the tubular member to displace the liquid dielectric and envelop the fusible conductor in a gaseous atmosphere when gases are evolved faster than they escape through the opening thereby to change the conditions under which the fusible conductor will fuse and interrupt the circuit through the electrical apparatus.

2. In a protective device for a transformer provided with a conductor wound into a coil and a liquid dielectric in which the coil is immersed, a fusible conductor connected in circuit relation with the coil, a tubular member disposed on the fusible conductor, the tubular member having an opening therein near the upper end to provide for the escape of gas at a predetermined rate and a hood for collecting gases disposed above the transformer coil and to deliver the gas collected to the tubular member disposed on the fusible conductor thereby to displace the liquid dielectric enveloping the fusible conductor when gases are evolved faster than they escape from the tubular member to change the conditions under which the fusible conductor will fuse, the size and shape of the hood being dependent upon the conditions to be met.

3. In a protective device for electrical apparatus provided with a conductor immersed in a dielectric liquid, in combination, a fusible conductor connected in circuit relation with the conductor immersed in the dielectric liquid, a tubular member disposed around the fusible conductor, a hood depending from the tubular member to collect gases evolved in the dielectric liquid, the fusible conductor, tubular member and hood all being immersed in the dielectric liquid, the tubular member having an opening therein to permit the escape of gases therefrom at a predetermined rate, and the hood serving to collect and deliver gases evolved to the tubular member whereby when gases are delivered to the tubular member at a rate in excess of the rate of escape the dielectric enveloping the fusible conductor is displaced with the result that the rate of current flow required to fuse the fusible conductor is reduced thereby to disconnect the conductor circuit under predetermined conditions.

JOHN K. HODNETTE.

REFERENCES CITED

The following references are of record in the file of this patent:

UNITED STATES PATENTS

| Number | Name | Date |
| --- | --- | --- |
| 1,192,879 | Ferrell | Aug. 1, 1916 |
| 1,705,715 | Clark | Mar. 19, 1929 |
| 1,907,845 | Macrae et al. | May 9, 1933 |
| 2,246,318 | Putman | June 17, 1941 |
| 2,351,969 | Hurst | June 20, 1944 |